Oct. 22, 1940.　　　G. W. THOMPSON ET AL　　　2,218,940

WHITE LEAD

Filed March 26, 1937

Gustave W Thompson  
Alexander Stewart  
INVENTORS

BY Jeffrey Kimball Eggleton  
ATTORNEYS

Patented Oct. 22, 1940

2,218,940

UNITED STATES PATENT OFFICE 2,218,940

WHITE LEAD

Gustave W. Thompson, Brooklyn, N. Y., and Alexander Stewart, Roselle, N. J., assignors to National Lead Company, New York, N. Y., a corporation of New Jersey Application March 26, 1937, Serial No. 133,244

13 Claims. (Cl. 23—70)

The invention relates to a novel basic carbonate white lead and the process of its manufacture.

While the conventional formula for white lead is $2PbCO_3.Pb(OH)_2$, the commercial product is found to contain varying chemical combinations of lead carbonate ($PbCO_3$), lead hydroxide ($Pb(OH)_2$) and uncombined normal lead carbonate ($PbCO_3$). The variation is due to difficulties in the control of the carbonating reaction and has been more or less unavoidable in the processes heretofore followed, correspondingly affecting the uniformity of the pigment as to its chemical and physical characteristics. This invention provides a new system whereby the carbonating reaction can easily be carried on to give a product not only of consistently uniform properties, chemical and otherwise, but also with notable manufacturing economy, and more especially, in its preferred form, to give a new white lead product definitely superior to the white leads heretofore available to the trade.

Among the desirable physical attributes in a pigment are tinting value and hiding power, fineness and uniformity of particle size, color, and oil-taking power. According to the preferred procedure under this invention, white lead can be made with a tinting value of approximately 220-240 as compared to a tinting value of 100-110 for the product of the standard Dutch process and with a particle distribution, determined by the Thompson cone classifier, indicated as an average diameter by surface mean of 3 microns and finer, approximately 99% as against 65% for the Dutch process, and also being substantially free from coarse particles or hard agglomerates, i. e., gritty particles which may be felt when the dry powder is rubbed between the fingers and known in the industry as "sandy lead". This new product has satisfactory oil absorption properties and unusually high paint thickening properties which is specially desirable. For example, by the Gardner mobilometer test, a paint containing 68% of this new white lead as the pigment has a mobility factor of 0.122, a gram yield value of 92, and a consistency value in seconds for a 120 gram plunger drop of 83, as compared to Dutch process white lead with a mobility factor of 0.202, a gram yield value of 24 and a consistency value in seconds of 6.5 for a 120 gram plunger drop, the drop being in all cases through or employing the middle 10 centimeters of the plunger stroke.

Figure 1:
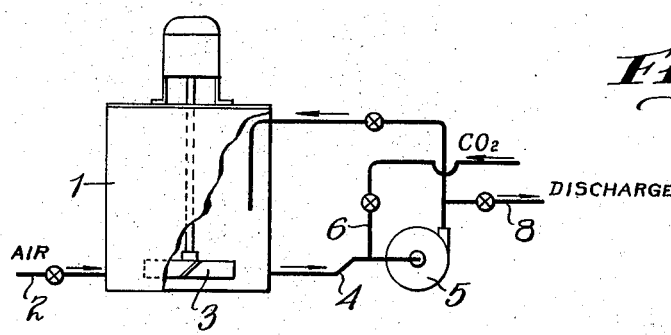
Figure 2:
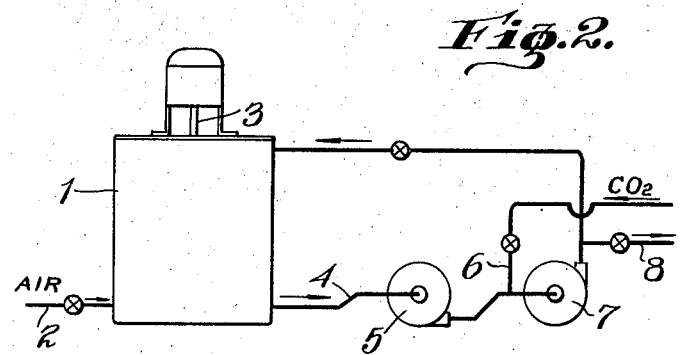

The new process can be carried out on the batch or continuous system and Fig. 1 represents in diagram suitable apparatus for the batch system, though without limitation thereto;

Fig. 2 shows a modification thereof; and

Figure 3:
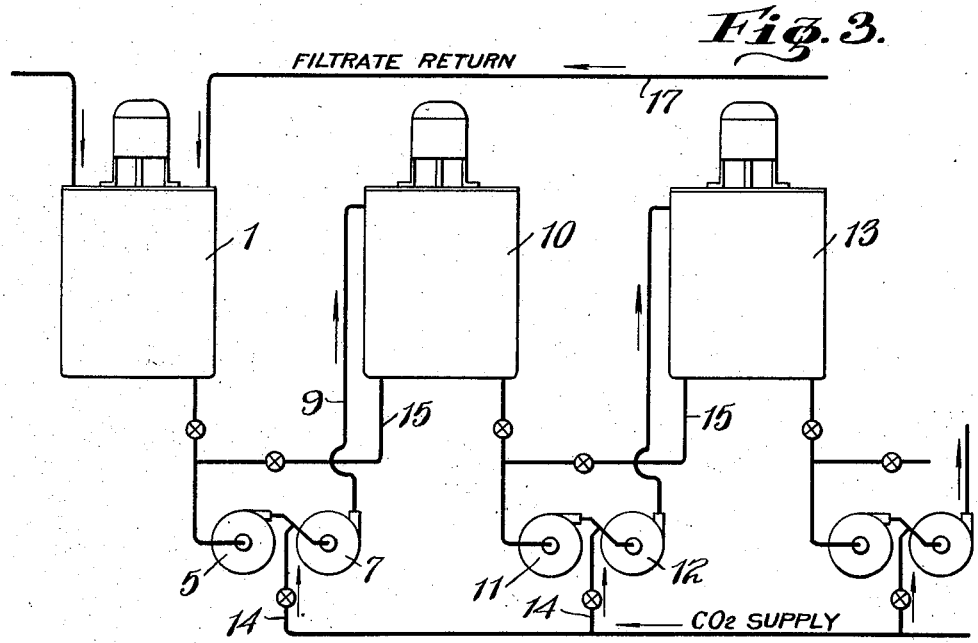

Fig. 3, an extension of the same apparatus adapted for continuous treatment.

According to this invention, a suspension or slurry is prepared of finely divided metallic lead or powdered lead oxide (PbO), or both, in water containing a relatively small amount of proper catalyst, such, for example, as lead acetate which is preferred, or some catalyst-forming agent, such as acetic acid. If the slurry is constituted of or contains metallic lead particles, it may be first blown with air or other oxidizing agent, according to known processes, until such particles are oxidized. This and the subsequent reactions can be satisfactorily conducted within the temperature range of 20–70° C. If pure lead oxide (PbO), i. e., free from metallic lead, is used to make the slurry, the oxidation step may be omitted. Fumed or sublimed litharge may be used but that degree of fineness is not required for the successful operation of this process.

In Fig. 1, 1 marks the slurry tank and 2 its air-blowing connection. A power stirrer, 3, keeps the slurry constantly agitated and in the condition of a suspension, reasonably homogeneous.

In this state it is subjected to the effect of being forced or circulated in the form of a stream or current through one or more treating systems, at the same time being charged with a carbonating gas $CO_2$ injected or introduced into it as or just after it enters the pumping or forcing mechanism of the system and so that the slurry and gas pass through the system together in close mechanical mixture. Whether it be due to the pump-created turbulence, the high velocity, the abrupt pressure changes within the system, the attrition effects, or to some other cause or causes, the effect of thus pumping the mixed gas and slurry has been found to exercise an important influence on the carbonating reaction and on the quality of the product. The result is quite different from that ordinarily obtainable from carbonating methods heretofore employed, i. e., blowing the gas into the slurry or spraying the slurry into an atmosphere of the gas. Aside from chemical considerations mentioned later, it gives an unusually high absorption and reaction efficiency and accounts for the substantially complete elimination of "sandy lead," in the product. It obviates the subsequent use of classification apparatus and the heavy expense attendant thereon.

The pump, or pumps used, can be of any ordinary type, centrifugal preferred, and it, or they, are of relatively small capacity and high speed. The reaction takes place, mainly, inside the pump intake or in the pump chamber or equivalent space wherein the reagents are momentarily confined in contact and violent agitation, and by the appropriate regulation of the gas admission, the reaction thus occurs in such space between fixed though regulable proportions of slurry and carbon dioxide. The slurry-gas mixture is passed either repeatedly through one or two pumps or spaces, comprised in a circulating system, or successively through a long series of them, being in any event kept agitated so that the solids are kept homogeneously distributed in the liquid during the treatment.

In the batch system as shown by Fig. 1, the slurry passes through the pump intake pipe 4 to the pump 5, and is delivered by the latter back to the tank 1. The supply of the carbonating gas which may be $CO_2$ or a mixture of such gas and air, is admitted by way of the pipe connection 6 under regulation of the valve indicated. The pump 5 which may be assumed to be an ordinary centrifugal type pump with a capacity approximating say, 450 gallons per minute at about 1750 R. P. M., circulates the slurry-gas mixture continuously from and to the tank while the power stirrer keeps the solids suspended. This circulation is continued until a predetermined and sufficient quantity of $CO_2$ has been absorbed, as later pointed out.

With a single pump, care is required that the gas admission does not render it gas-bound or otherwise interfere with the uniformity of the gas and slurry proportions. Greater precision can be secured by using two pumps in tandem as indicated in Fig. 2, where the second pump is marked 7, and the gas entrance located between the two is marked 6. The first pump feeds the slurry to the second under a pressure tending to balance that of the gas, also admitted under pressure, so that their relative admissions are more easily kept uniform.

By the use of two pumps, or with care by the use of only one, the rate of gas admission can be such that substantially all that admitted to the pump intake can be absorbed by the slurry before it reaches the slurry tank and this regulation, being the most economical, is preferred though not indispensable. There need be no waste of carbon dioxide, the gas is proportionately admitted and at a rate not substantially exceeding that at which it can be taken up by the slurry stream.

The final slurry is discharged through pipe 8, Fig. 2, and the white-lead water-pulp, with or without filtering or settling and siphoning, is transferred to a conventional oil incorporating system, where linseed oil is incorporated with the pigment, directly forming what is known as white-lead-in-oil, or the original pulp may be filtered without washing and then dried and packed as a dry product. The slurry liquor or filtrate can be re-used.

Figure 3 illustrates a form of the same apparatus suited for operation on a continuous basis. Instead of returning the slurry back to the original tank 1, it is delivered by the tandem pumps 5 and 7, via pipe line 9, to a second tank 10, and from the latter it is drawn or taken by another pair of tandem pumps 11 and 12, and delivered to another tank 13, and so on, until, in the last tank, the reaction is complete and the slurry discharged and treated as before.

The $CO_2$ admission is between the pairs of pumps as in Fig. 2, by the pipe connections marked 14, and each tank has its power stirrer to maintain the suspension. Return or by-pass pipes 15, are desirably provided for each container so that as necessity arises the partially reacted slurry of one tank may be returned back to the same tank, thus to prolong the treatment.

In any case, the air for oxidizing metallic lead, if any, may be blown into the slurry either previously to the pumping treatment or coincidently with it and air may be admitted along with the $CO_2$, the important consideration being that the metallic lead be entirely oxidized and reacted with the $CO_2$ before discharge so that it will not appear in the final white-lead water-pulp.

As will now be understood, any desired calculated amount of carbon dioxide may be admitted to the slurry by the means above described, and since the various mechanical conditions, such as pump speed, velocity of slurry, rate of gas admission and temperature, etc., are easily kept uniform, any calculated amount can be combined with a calculated amount of lead and the treatment can accordingly be depended upon to produce a white lead product consistently uniform in both chemical and physical properties. This is of special commercial importance.

The further part of this invention involves and depends upon a particular control of the gas admission and carbonating reaction which is easily performed according to the process above described. We have found that the initial basicity and also the 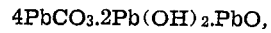 initial electrical resistance of the liquid phase of the slurry remain practically constant and unaffected for a considerable period after the gas injection has been started. For example, if the process is being conducted at 30° C., the initial pH value of the slurry which ordinarily approximates 9.5, and its initial specific resistance which may, with an operating temperature of 60° C., approximate 790 ohms, continue constant at these values for several hours and then with continued gas injection show a sharp change, the pH dropping abruptly to approximately 7.5 (at 30° C.), and the specific resistance abruptly increasing to approximately 1060 ohms (at 60° C.). These values, which are to some extent dependent upon temperature, quantity of catalyst, etc., are presented as examples and not as defining absolute properties of a slurry under the best conditions.

We have found that if the gas admission be stopped just at the beginning of this drop in pH value, or the increase in resistance, the solid phase of the slurry, after filtering and drying, at that moment will have a chemical composition, which may be expressed by the formula $$4PbCO_3.2Pb(OH)_2.PbO,$$

and with little or no uncombined lead carbonate ($PbCO_3$) or lead hydroxide ($Pb(OH)_2$) present, and our further invention consists in continuing the gas admission or the carbonating reaction only up to or about this critical point. The white lead pulp obtaining at this moment is then separated from the liquor and transferred to the regular oil-incorporating system to make white-lead-in-oil, or to the dryer to make dry white lead. The composition above indicated characterizes the new white lead product first above referred to. It has a total $CO_2$ content of between 9.92 and 10.3%, a total combined water content of between 1.9 and 2.1% and a total PbO content of about 88%, being partially or wholly hydrated and being, as we believe, the most basic carbonate of lead.

Several specific chemical analyses of this product after drying at 105° C., are as follows:

| | Example | | | | | |
|---|---|---|---|---|---|---|
| | #1 | #2 | #3 | #4 | #5 | #6 |
| | Percent | Percent | Percent | Percent | Percent | Percent |
| Carbon dioxide ($CO_2$) | 9.92 | 10.00 | 10.10 | 10.20 | 10.30 | 10.3 |
| Combined water ($H_2O$) | 2.03 | 2.00 | 2.07 | 2.10 | 2.10 | 1.9 |
| Total lead oxide (PbO) | 88.05 | 88.00 | 87.83 | 87.70 | 87.60 | 87.8 |
| | 100.00 | 100.00 | 100.00 | 100.00 | 100.00 | 100.00 |

While we have assigned to it the empirical formula of $4PbCO_3.2Pb(OH)_2.PbO$, as above stated, the product may be partially or wholly hydrated, and if wholly hydrated the empirical formula might be $4PbCO_3.3Pb.2H_2O$ or, in aqueous suspension, might properly be considered as a hydrated lead oxide-lead hydroxide-lead carbonate combination whereof the formula might be expressed as $4PbCO_3.2Pb(OH)_2.PbO.H_2O$. The hydrated mole of PbO, being unstable, loses its water of hydration when the ratio of free water to total solids is lowered by filtering, drying, or other de-watering.

The composition can also be properly identified by the molar ratio of its component ingredients as follows:

$PbO:CO_2:H_2O = 3.36$ to $3.74:2$ to $2.22:1$ or

Total PbO:total basic PbO = 2.33 to 2.48:1

The basic PbO content of basic lead carbonate white lead, it may be said, is the PbO content represented in the formula as not being in direct combination with $CO_2$. The lead carbonate content of white lead made in accordance with the preferred form of this invention ordinarily approximates 60.2% to 62.5%, equivalent to a PbO content of 50.3% to 52.2% and therefore the PbO content comprising the basic portion of the white lead approximates 35.3% to 37.7% and with a total PbO content of 87.6% to 88.1%.

If the gas admission is stopped prematurely, i. e., before reaching the critical point, more or less uncombined PbO will be certain to be found in the pulp and the color and tinting value of the final product will be poor and low. The critical point indicates the disappearance of one of the constituents of the solid phase of the slurry and results from the changed degree of basicity of the dissolved catalyst-forming agent when in equilibrium with the single solid phase represented by the aforementioned composition.

If the gas admission is continued beyond the critical point, an additional solid phase develops in the slurry which may be represented by the formula $2PbCO_3.Pb(OH)_2$, and which by itself would be ordinary white lead. The resulting pulp then becomes a mixture of this ordinary white lead with the new white lead of the formula $4PbCO_3.2Pb(OH)_2.PbO$ or otherwise, as explained above. The presence of $2PbCO_3.Pb(OH)_2$, if not in too great proportion does no harm beyond somewhat reducing the tinting value and hiding power, and we do not intend to limit our product invention by its complete exclusion or by the exclusion of any normal carbonate. Continued gas admission will quickly convert all of the solids into $2PbCO_3.Pb(OH)_2$, or ordinary white lead, at which time the pH value of the liquid phase will have dropped to about 6.2 as measured at 30° C.

and the $CO_2$ content of the white lead will have risen to about 11.3% and the combined water to about 2.3%. Still further admission will eventually convert the pulp to normal carbonate, $CO_2$ content about 16.4%. It is important, therefore, when the highest tinting value is desired, to stop gas admission promptly at the very beginning of the change from the initial and previously constant pH value or the specific resistance value. The change of hydrogen ion concentration occurs abruptly and care is needed to guard against exceeding the critical point further than will produce the quality of product desired. While the white lead product of this invention consists primarily of the chemical compound to which we have assigned the empirical formula $4PbCO_3.2Pb(OH)_2.PbO$, or $4PbCO_3.3PbO.2H_2O$ it includes also mixtures or blends in which this compound is present in sufficient qualtity to impart its superior attributes to the mixture.

A specific example of the practice of the invention in the production of the new product is as follows: To 1,000 gallons of water, 1,760 pounds of finely divided metallic lead or litharge or a mixture of litharge and finely divided metallic lead are added together with between 2¾ to 5½ pounds of lead acetate or catalyst-forming agent, for example, 1¼ to 2½ pounds of 70% acetic acid. Agitation is started in the main tank, passing air into the slurry continuously. The pump or pumps are started and the carbon dioxide flow is also started, the admission rate being adjusted to the size of the equipment which in the particular instance under description, was at the rate of 20 lbs. of carbon dioxide, or about 1900 cubic feet of 10% by volume of carbon dioxide gas in air per hour. Cost permitting, pure dry carbon dioxide gas could be used. The temperature of the reaction is maintained within limits of 20–70° C., by injecting live steam as needed or otherwise, although this may vary considerably without affecting efficiency or the quality of the product. The critical point above disclosed will ordinarily be reached in about ten hours at which times gas admission is stopped and the pumps are then used to deliver the pulp to the storage department. It will be appreciated that the absence of "sandy lead" and also free metallic lead, as already stated, eliminates the need and expense of the classifying operations, which ordinarily next succeed after the carbonation. It will be appreciated further that within the principles above explained various departures are possible and will be resorted to according to particular circumstances, and within the scope of the claims appended hereto.

We claim:

1. The process of making basic carbonate white lead which comprises maintaining a slurry of lead oxide with a carbonation-promoting catalyst, reacting on such slurry with carbon dioxide until the liquid phase of the slurry shows an abrupt drop in pH value and the solid phase of the slurry attains the formula $4PbCO_3.2Pb(OH)_2.PbO$, ceasing such reaction when this condition has been reached and separating out the solid phase while it consists mainly of basic carbonate of the composition indicated by said formula.

2. The process of making basic carbonate white lead which comprises maintaining in a suitable tank, a slurry of lead oxide in water containing a carbonation-promoting catalyst, passing a current of the slurry from the tank through a separate treating chamber under conditions of violent turbulence mechanically imposed upon it in such chamber, simultaneously admitting carbon dioxide into said chamber, and repeating such treatment until the liquid phase of the slurry shows an abrupt drop in pH value and the solid phase of the slurry has attained a composition represented by the formula $4PbCO_3.2Pb(OH)_2.PbO$.

3. The process of making white lead containing as its principal component basic lead carbonate of the formula $4PbCO_3.2Pb(OH)_2.PbO$, which comprises maintaining a suspension of lead oxide in water containing a carbonation-promoting catalyst, in a suitable tank, passing a current of such suspension from the tank through a separate treating chamber under conditions of violent turbulence while admitting carbon dioxide into such chamber, repeating such treatment under the same conditions of turbulence and gas admission until the pH value of the liquid phase of the suspension manifests an abrupt drop following an initial level period of substantially no variation, and then ceasing gas admission and filtering out the solid phase.

4. The process of making white lead containing as its principal component basic lead carbonate of the formula $4PbCO_3.2Pb(OH)_2.PbO$, which comprises reacting on a slurry of lead oxide in water containing a carbonation-promoting catalyst, with carbon dioxide until the pH value of the liquid phase of the slurry manifests an abrupt drop to about 7.5, following an initial level value of about 9.5, and ceasing the reaction and removing the solids while the pH indication remains at said lower value.

5. The process of making white lead containing as its principal component basic lead carbonate of the formula $4PbCO_3.2Pb(OH)_2.PbO$, which comprises maintaining a suspension of lead oxide in water containing a carbonation-promoting catalyst, in a suitable tank, passing a current of such suspension through a separate treating chamber under high turbulence, while admitting carbon dioxide into such chamber and regulating the rate of such admission so as to be substantially completely absorbed by the suspension, repeating such treatment under like conditions of turbulence and gas admission until the pH value manifests an abrupt drop following an initial level period of substantially no variation, and ceasing gas admission and separating out the solids before the pH value manifests a further drop.

6. The process of making basic carbonate white lead which comprises maintaining in agitation in a suitable tank a slurry of lead oxide, water and a carbonation-promoting catalyst, circulating such slurry through a separate treating chamber and back to the tank, mechanically and violently agitating the slurry in its passage through said treating chamber and coincidentally admitting $CO_2$ into said chamber until the pH value of the liquid phase in said tank manifests an abrupt drop following an initial substantially level value and the solid phase is largely constituted of white lead having the empirical farmula of $4PbCO_3.2Pb(OH)_2.PbO$, then ceasing such treatment and separating out the solid matter.

7. White lead comprised essentially of basic lead carbonate obtained by the process of claim 1 and corresponding to the empirical formula $4PbCO_3.2Pb(OH)_2.PbO$ characterized by substantial freedom from particles exceeding 3 microns diameter by surface mean and by tinting and paint thickening properties substantially in excess of those of standard Dutch process white lead.

8. White lead comprising basic lead carbonate formed by reaction of gaseous $CO_2$ on lead hydrate according to claim 1 and corresponding to the empirical formula $4PbCO_3.2Pb(OH)_2.PbO$ and characterized by its pure white color without yellow component, its substantial freedom from particles in excess of 3 microns diameter and paint thickening properties greatly in excess of those of standard Dutch process white lead.

9. The process of making white lead which comprises subjecting a carbonatable lead oxide slurry to a succession of partial carbonating treatments, each such treatment consisting in passing the slurry from a tank through a small treating chamber under conditions of violent agitation mechanically imposed upon it within the chamber, while admitting carbon dioxide to such chamber at a rate no greater than can be absorbed by the slurry during its passage through the chamber and such treatment being repeated on said slurry until it is free of uncombined lead oxide.

10. The process of making white lead which comprises subjecting a carbonatable lead oxide slurry to a succession of partial carbonating treatments, each such treatment consisting in passing the slurry from a tank through two series-connected pumps wherein it is subject to violent agitation, while admitting carbon dioxide to the second pump at a rate no greater than can be absorbed by the slurry during its passage therethrough, such treatment being repeated on said slurry until it is free of uncombined lead oxide.

11. White lead comprised essentially of basic lead carbonate corresponding to the empirical formula $4PbCO_3.2Pb(OH)_2.PbO$, characterized by having over 90% of its particles of diameter smaller than 3 microns by surface mean, by having a lead carbonate content between about 60.2% and about 62.5%, a tinting value in the general order of 200, and a mobility factor in the order of .122 by Gardner mobilometer test for paint composed of 68% of said white lead as the pigment.

12. The process of making basic white lead which comprises maintaining a carbonatable slurry of lead oxide, passing a current of such slurry through a treating chamber under conditions of violent agitation, while admitting carbon dioxide gas into such chamber and continuing such treatment until the pH value of the liquid phase manifests an abrupt drop following an initial level period of substantially no variation and ceasing gas admission and separating out the solid phase before the pH value manifests a further drop.

13. The process of making white lead which comprises maintaining a carbonatable lead oxide slurry in a state of agitation in a suitable tank in part at least by blowing air into it, subjecting such slurry to a succession of partial carbonating treatments, each such treatment consisting in passing slurry from said tank through a small treating chamber under conditions of violent agitation mechanically imposed upon it within the chamber, while admitting carbon dioxide to such chamber at a rate no greater than can be absorbed by the slurry during its passage through the chamber and such treatment being repeated on said slurry until it is free of uncombined lead oxide.

GUSTAVE W. THOMPSON.
ALEXANDER STEWART.

CERTIFICATE OF CORRECTION.

Patent No. 2,218,940.  October 22, 1940.

GUSTAVE W. THOMPSON, ET AL.

It is hereby certified that error appears in the printed specification of the above numbered patent requiring correction as follows: Page 3, first column, line 20, in the formula, for "3Pb" read --3PbO--; and that the said Letters Patent should be read with this correction therein that the same may conform to the record of the case in the Patent Office.

Signed and sealed this 3rd day of December, A. D. 1940.

(Seal)
Henry Van Arsdale,
Acting Commissioner of Patents.